(12) United States Patent
Makaran et al.

(10) Patent No.: US 6,433,507 B1
(45) Date of Patent: Aug. 13, 2002

(54) SPREAD SPECTRUM MOTOR CONTROL CIRCUIT

(75) Inventors: John E. Makaran; Andrew Lakerdas, both of London (CA)

(73) Assignee: Siemens Automotive Inc., Mississauga (CA)

( * ) Notice: Subject to any disclaimer, the term of this patent is extended or adjusted under 35 U.S.C. 154(b) by 0 days.

(21) Appl. No.: 09/536,561

(22) Filed: Mar. 28, 2000

Related U.S. Application Data
(60) Provisional application No. 60/183,413, filed on Feb. 18, 2000.

(51) Int. Cl.[7] ................................................. H02P 5/28
(52) U.S. Cl. ..................... 318/811; 318/599; 388/829; 388/831; 388/804; 388/809
(58) Field of Search ................................ 388/829, 831, 388/804, 809, 811, 816, 819; 318/599, 811

(56) References Cited

U.S. PATENT DOCUMENTS

| 5,450,521 | A | * | 9/1995 | Redlich | 388/829 |
| 5,917,720 | A | * | 6/1999 | Galbiati | 363/98 |
| 6,151,345 | A | * | 11/2000 | Gray | 363/98 |
| 6,191,966 | B1 | * | 2/2001 | Yu | 363/98 |

* cited by examiner

Primary Examiner—Karen Masih

(57) ABSTRACT

A motor control circuit for use in a motor circuit includes a varying duty cycle pulse width modulation circuit and a switch. The varying duty cycle pulse width modulation circuit is operable to generate a PWM signal having a varying duty cycle, wherein an average of said varying duty cycle corresponds to a desired motor speed. The switch has a control input operably coupled to the pulse width modulation circuit to receive the PWM signal therefrom. The switch further includes first and second terminals, the first terminal adapted to be coupled to a coil of the motor circuit, the switch operable to selectively electrically connect and disconnect the first and second terminals based in part on the PWM signal received by the control input.

27 Claims, 2 Drawing Sheets

SPREAD SPECTRUM MOTOR CONTROL CIRCUIT

This application claims the benefit of U.S. Provisional Patent Application No. 60/183,413 filed Feb. 18, 2000.

FIELD OF THE INVENTION

The present invention relates generally to motor circuits, and more particularly, to motor circuits that employ pulse width modulation.

BACKGROUND OF THE INVENTION

Speed control in electric motor devices may be accomplished in a variety of maimers. In brush-type motors that use a DC power source, a semiconductor such as a MOSFET may be used as a resistive load that controls the current provided to the armature windings. The resistance of the MOSFET may be controlled to achieve the desired speed. However, the use of the MOSFET as a series resistive element results in reduced efficiency of the motor.

Another speed control method for brush-type motors employs switching semiconductors. According to this method, semiconductor switches repeatedly open and close the circuit between the armature winding or coil and the DC power supply at a select frequency to drive the motor with a controlled average voltage. One may alter or control the speed in such motors by controlling the semiconductors with a pulse-width modulated signal. The pulse-width modulated (PWM) signal determines the duration that the semiconductor is turned on, or duty cycle, which in turn affects the average voltage provided to the armature windings and thus the speed of the motor.

Both high frequency and low frequency PWM signals have been used to drive DC-powered brush-type motors. Low frequency PWM signals are PWM signals having a switching frequency in the audible frequency range. A drawback to using low frequency PWM signals is that such signals can generate mechanical vibration in the audible range. Such mechanical vibration may be significant in applications in which the motor drives a mechanical assembly, such as for example, a vehicular cooling fan. Mechanical vibration in a vehicular cooling fan can cause an undesirable amount of audible noise.

High frequency PWM signals include ultrasonic or near ultrasonic switching frequencies, for example, 18 kHz and higher. One benefit of using such high frequency PWM signals for motor drives is that such signals typically do not generate audible mechanical vibration. However, one drawback of the use of ultrasonic PWM signals to drive a DC brush-type motor is that such signals can generate a high level of conducted and radiated (and conducted) noise in the RF range. One disadvantage associated with the high level of conducted and radiated noise is that it may require shielding to pass various industry and government requirements for EMI emissions. In general, higher frequencies require more elaborate shielding than lower frequencies.

Accordingly, there exists a need for a DC brush-type motor control circuit that includes the reduce loss benefits of using a switch driven by a PWM signal without the mechanical noise drawbacks of the low frequency PWM signal or the radiated noise drawbacks of the high frequency PWM signals.

In other types of motors, it has been found that randomly, or pseudorandomly, varying the switching frequency of a constant duty cycle PWM signal has the effect of spreading the noise associated with the switching operation. For example, a 6 KHz switching frequency may be varied five or ten percent to spread the RF and/or mechanical noise spectra, thereby reducing the effects of the noise at any one particular frequency. Such technology has been implemented in the context of three-phase asynchronous motors.

A drawback to the random variation of the switching frequency is that it is not easily implemented in typical applications. In particular, PWM signals for motor control use are typically generated by counter circuits that operate off of a clock signal. Counter circuits obtain the clock signal, which is typically several times that of the desired switching frequency. The counter circuits include "divide down" circuitry that divides the clock signal frequency down to the desired switching frequency. Thus, in order to change the switching frequency, the counter must alter the divisor value in its divide down circuitry. Achieving a pseudorandom distribution of frequencies within five percent of the nominal frequency cannot be easily accomplished through such alteration of the divide down circuitry of the counter.

There exists a need, therefore, for a method and apparatus for driving a motor with a PWM signal that has reduced noise and furthermore is readily adapted for use in connection with commonly available and relatively low cost PWM signal generating architectures. There also exists a need for a method and apparatus for driving a DC brush-type motor with a PWM signal that has reduced mechanical and/or RF noise.

SUMMARY OF THE INVENTION

The present invention fulfills the above needs, as well as others, by providing a motor control circuit that employs PWM signals having a varying duty cycle. The varying duty cycle spreads the spectrum of the noise associated with the use of PWM signals for controlling the current through the motor windings.

An exemplary embodiment of the present invention is a motor control circuit for use in a motor circuit, the motor control circuit including a varying duty cycle pulse width modulation circuit and a switch. The varying duty cycle pulse width modulation circuit is operable to generate a PWM signal having a varying duty cycle, wherein an average of said varying duty cycle corresponds to a desired motor speed. The switch has a control input operably coupled to the pulse width modulation circuit to receive the PWM signal therefrom. The switch further includes first and second terminals, the first terminal adapted to be coupled to a coil of the motor circuit, the switch operable to selectively electrically connect and disconnect the first and second terminals based in part on the PWM signal received by the control input.

An exemplary method according to the present invention is a method of controlling a motor circuit. The method includes a step generating a PWM signal, the PWM signal having a varying duty cycle, wherein an average of said varying duty cycle corresponds to a desired motor speed. The PWM signal is then provided to a switch. The switch is then employed to alternately electrically connect and disconnect a motor winding to a DC power source based in part on the PWM signal received by the control input.

By using a varying duty cycle PWM signal to switch the coil of the motor circuit, the audible and/or RF noise energy that may otherwise be caused by the switching is spread over a wider spectrum, thereby limiting the concentration of noise energy at any one frequency. In one embodiment of the invention, the spreading of the audible noise spectrum advantageously facilitates the use of low frequency PWM signals for controlling a motor circuit, thereby avoiding the EMI shielding problems associated with the use of higher frequency PWM signals. By varying the duty cycle of the PWM signal, a well distributed noise energy spectrum may be achieved with commonly-used, relatively low cost PWM signal generating circuit components.

The above described features and advantages, as well as others, will become more readily apparent to those of ordinary skill in the art by reference to the following detailed description and accompanying drawings.

DETAILED DESCRIPTION

Figure 1:
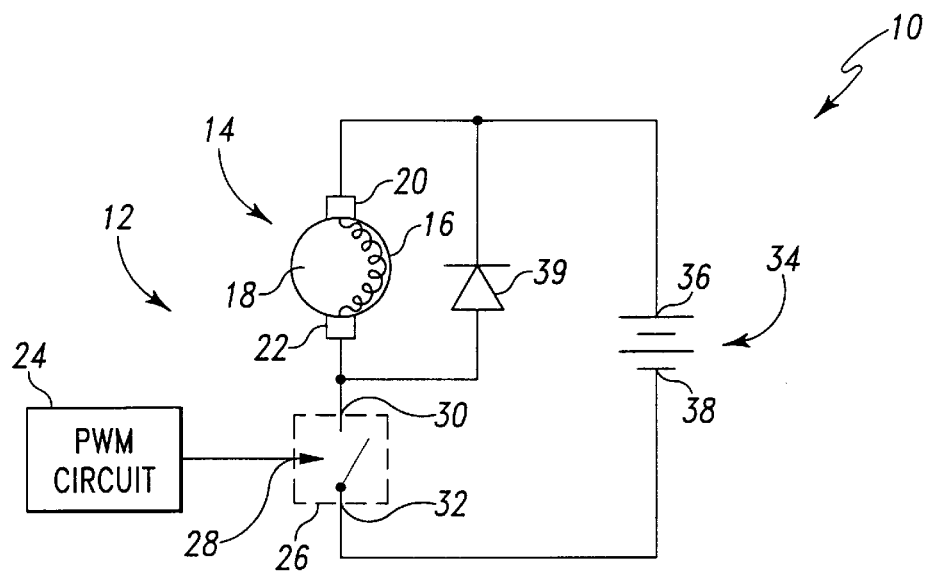
FIG. 1 shows a schematic block diagram of an exemplary motor circuit that includes a motor control circuit in accordance with the present invention.

FIG. 1 shows a schematic block diagram of an exemplary motor circuit 10 that includes a motor control circuit 12 in accordance with the present invention. The exemplary motor circuit 10 further includes a brush-type motor 14 having a rotor 16, at least one winding or coil 18, and first and second brushes 20 and 22. The motor 14 further includes a stator, not shown, the arrangement of which would be known to those of ordinary skill in the art.

As is known in the art, the rotor 16 is disposed within or about the stator and is operably arranged to rotate with respect to the stator. The coil 18 is affixed to the rotor 16 and thus rotates therewith. The brushes 20 and 22 are affixed to or near the stator and remain stationary with respect to the stator. The brushes 20 and 22 are electrically coupled to opposing ends of the coil 18, and provided electrical contact therewith when the coil 18 is rotating. The detailed construction of the brush-type motor 14 would be known to those of ordinary skill in the art.

A DC power supply 34 is further provided, which is not strictly a part of the motor circuit 10. The DC power supply 34 may be a battery, such as a vehicle battery, or another DC power source such as a source of rectified AC power. The DC power supply 34 includes a positive voltage terminal 36 and a negative voltage terminal 38. In general, the negative voltage terminal 38 operates as circuit ground.

In accordance with the present invention, the motor control circuit 12 includes a varying duty cycle pulse width modulation circuit (PWMC) 24 and a switch 26. The varying duty cycle PWMC 24 is a circuit, which may suitably include or comprise a vehicle engine control unit, that generates PWM signals having a varying duty cycle wherein the average of the varying duty cycle corresponds to a predetermined rotor speed. Further details regarding the construction and operation of the varying duty cycle PWMC 24 are provided below.

The switch 26 includes a control input 28, a first terminal 30 and a second terminal 32. The switch 26 may suitably be any device that selectively electrically connects the first terminal 30 to the second terminal 32 based upon the voltage and/or current present at the control input 28. Thus, for example, the switch 26 may suitably be a MOSFET device, a bipolar junction transistor, a thyristor, or the like. In any event, the control input 28 is operably coupled to the varying duty cycle PWMC 24. The first terminal 30 is coupled to the second brush 22 of the motor 14. The second terminal 32 is coupled to the negative voltage terminal 38 of the DC power source 34.

Depending on the type of switch 26 that is employed, a driving circuit or bias circuit may be required to operably couple the control input 28 to the PWMC 24. Those of ordinary skill in the art may readily determined the appropriate device and accompanying driving or biasing circuit to employ based on their particular implementation needs.

The motor circuit 10 further includes a freewheeling diode 39 that is coupled in forward bias from the first terminal 30 of the switch 26 to the positive voltage terminal 36 of the DC power supply 34. As is known in the art, the freewheeling diode 39 allows current to flow back to the DC power supply 34 to prevent an excessive voltage surge from developing at the first terminal 30 of the switch 26 when the switch 26 is turned off during operation of the motor 14.

In operation of the motor 14, the rotor 16 rotates in response to current from the DC power source 34, which is regulated by the motor control circuit 12 of the present invention.

Figure 4:
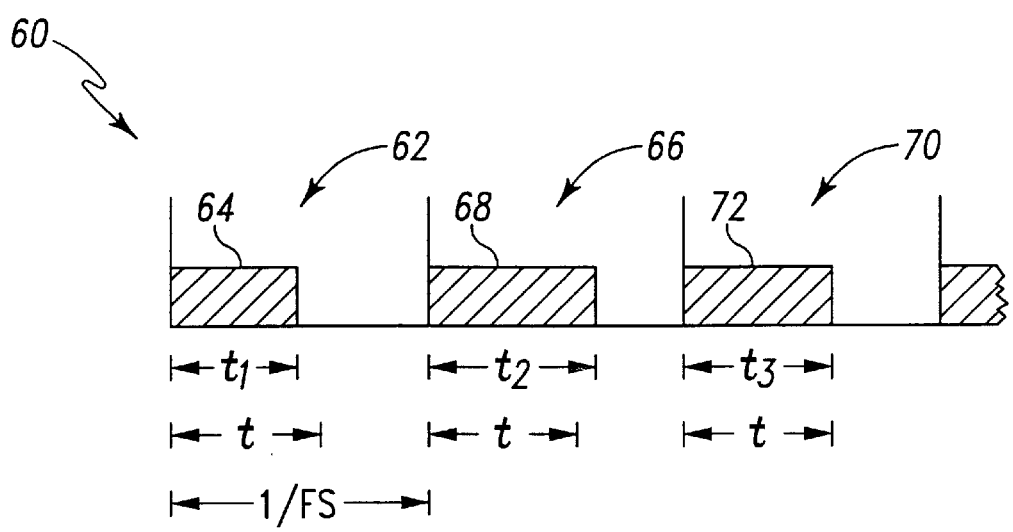
FIG. 4 shows a timing diagram of an exemplary pulse sequence generated by the motor control circuit of FIG. 1 in accordance with the present invention.

In particular, the varying duty cycle PWMC 24 generates a varying duty cycle PWM signal that is provided to the control input 26. FIG. 4 shows a timing diagram of an exemplary pulse sequence 60 generated by the motor control circuit of FIG. 1 in accordance with the present invention. The pulse sequence 60 represents three cycles 62, 66 and 70 of a varying duty cycle PWM signal in accordance with the present invention. It will be appreciated that the PWM signal will have substantially more cycles.

Each of the cycles 62, 66 and 70 has an on-time and an off-time. By contrast, the on-time is the period of the cycle in which a pulse is present. Thus, for example, the first pulse 64 represents the on-time of the first cycle 62 of the PWM pulse sequence 60. By contrast, the off-time is the period of the cycle in which a pulse is not present. As is known in the art, the duty cycle is the ratio of the on-time or pulse period to the entire cycle period.

In accordance with the present invention, the duty cycles of the pulses in the first, second and third cycles 62, 66 and 60 vary while the cycle or switching frequency remains constant. Thus, in other words, the first pulse 64, the second pulse 68 and third pulse 72 vary in duration while the first cycle 62, the second cycle 66, and the third cycle 60 have the same duration. In addition, although the duty cycles vary, the average duty cycle for a large number of cycles of the PWM signal according to the present invention corresponds to a particular desired motor speed.

Figure 3:
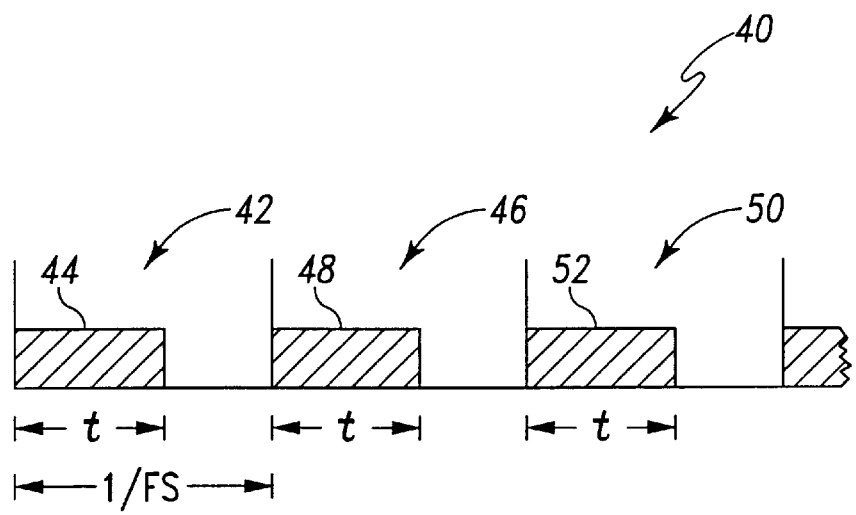
FIG. 3 shows a timing diagram of an exemplary pulse sequence from a prior art PWM signal for use in a motor control circuit.

By way of contrast, FIG. 3 shows a pulse sequence 40 of a prior art PWM signal in which the duty cycles of the pulses do not vary, but remain constant when the desired motor speed is constant. In particular, the pulse sequence 40 includes first, second and third cycles 42, 46, and 50, respectively. The first cycle 42 has a period or duration of 1/fs where fs is the switching frequency. The first cycle 42 also includes a first pulse 44 having a duration t. Accordingly, the first cycle 42 has a duty cycle which is equal to the ratio of the pulse period to the cycle period, or t/(1/fs), which may be reduced to (t)(fs). Likewise, the second cycle 46 has the same duration, 1/fs, and second pulse 48 having the same duration t. Accordingly, the second cycle 46 also has a duty cycle of (t)(fs). Similarly, the third cycle 50 has the same duty cycle. Moreover, all of the other cycles of the prior art PWM signal, not shown, would also have the same duty cycle (t)(fs). The duty cycle (t) (fs) corresponds to the desired motor speed. If the desired motor speed changes, then either t or fs may be changed accordingly.

According to the present invention, however, the duty cycle varies, but has an average that corresponds to the desired motor speed. For example, as shown in FIG. 4, the first cycle 62 has a duration 1/fs, but has a pulse 64 with a pulse duration of t1 (which is less than t). As a result, the duty cycle of the first cycle 62 is (t1)(fs). The second cycle 66, however, has the same duration 1/fs, but has a pulse 68 with a pulse duration of t2, which is greater than t. Accordingly, the duty cycle of second cycle 66, (t2)(fs), is greater than the duty cycle (t1)(fs) of the first cycle 62. The third cycle 70, moreover, has a pulse 72 with a pulse duration t3, which is approximately equal to t. Accordingly, the duty cycle of the third cycle 70, (t3)(fs), is greater than the duty cycle of the first cycle 62 but less than the duty cycle of the second cycle 66. However, the various duty cycles of the PWM signal according to the present invention advantageously have an average, over a substantial plurality of duty cycles, that corresponds to a desired motor speed. Thus, for example, if the desired motor speed corresponds to a constant duty cycle (t)(fs), such as is shown in FIG. 3, then the PWM signal shown in FIG. 4 should have duty cycles such that [(t1)(fs)+(t2)(fs)+(t3)(fs)+. . . +(tN)(fs)]/N=(t)(fs).

The variation of the duty cycles as described in connection with FIG. 4 spreads the frequency distribution of the noise generated by the switch 26 of FIG. 1, as will be discussed further below. In order to achieve the desired average duty cycle, the PWM signal may be generated such that the on-time or pulse period of each cycle is equal to a base on-time and a random or pseudorandom on-time adjustment. Thus, for example, the pulse period tx of any given cycle may be given by the equation:

$$tx = t \pm (r*a*t)$$

where the value t is the base on-time that corresponds to the desired average duty cycle, the value r is a random or pseudorandom number between 0 and 1, and the value a is a weighting value for the adjustment, which may suitably be 0.05. In such a case, the random on-time adjustment, ±r*a*t, would provide a random variation of plus or minus five percent of the desired average t value. Because a random adjustment is used, the average on-time adjustment will tend toward zero over several cycles. As a result, the average value of tx over time will tend toward t.

It is noted that in the example described in connection with FIG. 4, the pulse period tx is varied to change the duty cycle while the switching frequency fs is held constant. This allows the noise spectrum to be spread without encountering the difficulties associated with constantly changing the switching frequency. In particular, up-down counters and the like are widely used to generate PWM signals because they are convenient and inexpensive. Clock speed changes in such counters are usually accomplished by changing the divide down values that develop the switching frequency from input clock signal. Changing the divide down value, however, does not allow for much granularity in frequency alteration. As a result, if a counter (or a similar device) is employed to generate the PWM signal in a motor control circuit, the spectrum of the created noise will not be well distributed because of the lack of granularity in the frequency alteration. While use of a software clock may improve the granularity of the changing frequency and achieve better spreading, the use of a variable software clock is computationally burdensome and thus undesirable. Accordingly, the present invention provides the added advantage of not relying solely on frequency changes to accomplish noise spectrum spreading.

Referring again to the general operation of the motor circuit 10 of FIG. 1, the varying duty cycle PWMC 24 generates a varying duty cycle PWM signal that has an average duty cycle that corresponds to a desired motor speed, as described above. The PWMC 24 provides the varying duty cycle PWM signal to the control input 28 of the switch 26. The control input 28 then alternately electrically connects and disconnects the first terminal 30 to and from the second terminal 32 responsive to the varying duty cycle PWM signal. The alternate connection and disconnection of the first terminal 30 to and from the second terminal 32 alternately completes and breaks, respectively, the circuit connection from the coil 18 to the negative voltage terminal 38 of the DC power source 34.

In particular, during the on-time of the PWM signal, (e.g. during the pulses 64, 68 and 72 of FIG. 4), the first terminal 30 is electrically connected to the second terminal 32. By electrically connected, it is meant that a non-insignificant amount of current may flow between the first terminal 30 and the second terminal 32. Thus, during the on-time, a circuit is completed from the positive voltage terminal 36 of the DC power source 34, through the coil 18, to the negative voltage terminal 38 of the DC power source 34. The current flow within the coil 18 cooperates with the magnetic field generated by the stator of the motor 14 to generate a rotational motive force on the rotor 16.

During the off-time of the PWM signal, the first terminal 30 is electrically disconnected from the second terminal 32. By electrically disconnected, it is meant that current is largely prohibited from flowing from the first terminal 30 to the second terminal 32. Thus, during the off-time, no circuit is completed between the positive voltage terminal 36 to the negative voltage terminal 38 through the coil 18 of the motor 14. As a result, little or no additional motive force is exerted on the rotor 16 during the off time.

It is noted, however, that during the off-time, stored energy within the coil 18 in the form of current continues to flow toward the first terminal 30 of the switch 26. To prevent a large and potentially damaging voltage buildup on the switch 26 from this continued current flow, the stored energy is released through the freewheeling diode 39 to the positive voltage terminal 36 of the DC power source 34. This energy, until it is dissipated, also causes a modest amount of additional motive force to be exerted on the rotor 16 during the off-time of the PWM signal.

The on-time and off-time, and therefore the duty cycle, of the PWM signal can be manipulated to increase or decrease the rotational motive force exerted on the rotor 16, as is well known in the art, in order to control the speed of the rotor 16. In accordance with the present invention, the average duty cycle of the PWM signal, which otherwise has a varying duty cycle, is chosen such that it corresponds to a desired motor speed.

By varying the duty cycle of the PWM signal, the present invention spreads the noise caused by the switch 26. In particular, the switch 26, which is typically a transistor or similar device, generates radiated noise having a frequency spectrum that corresponds to that of the PWM signal. The switch 26 may even cause audible noise if the switching frequency and/or its harmonics are within the audible range. To this end, the PWM signal energy can be translated to the rotor 16 and cause an audible vibration therein. The noise problem is pronounced when the PWM signal has a constant frequency and duty cycle because the noise is concentrated in the frequencies that are the harmonics of the PWM signal. The present invention, however, constantly changes the duty cycle, thereby altering the harmonics of the PWM signal and spreading the energy spectrum of the PWM signal. Thus, the radiated energy is spread over a wide range. Additionally, any potential audible noise is reduced because the rotor 16 cannot develop a consistent vibration frequency sufficient to cause significant audible noise.

Thus, for example, a brush-type motor such as the motor 14 may be run using a relatively low switching frequency, such as between 20 Hz and 500 Hz, with reduced risk of audible noise due to vibration of the rotor and whatever is being driven by the rotor. Running the brush-type motor at such low frequencies greatly reduces the electromagnetic interference shielding burden on the motor drive circuit.

Figure 2:
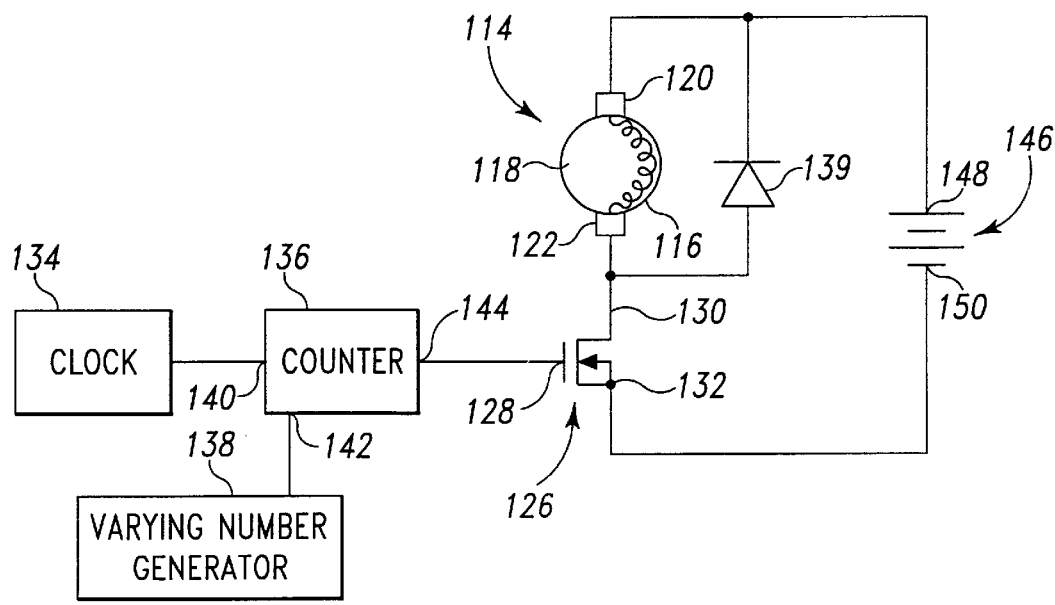
FIG. 2 shows a schematic block diagram of an exemplary motor circuit that includes an exemplary embodiment of the motor control circuit of FIG. 1.

FIG. 2 shows a schematic block diagram of an exemplary motor circuit 110 that includes an exemplary motor control circuit 112 in further detail. The exemplary motor circuit 110 further includes a brush-type motor 114 having a rotor 116, at least one coil 118, and first and second brushes 120 and 122. The motor 114 further includes a stator, not shown, and is configured in the manner described above in connection with the motor 14 of FIG. 1.

A DC power supply 146 is further provided, which is not strictly a part of the motor circuit 110. As with the DC power supply of FIG. 1, the DC power supply 146 includes a positive voltage terminal 148 and a negative voltage terminal 150 and may suitably be a battery.

In accordance with the present invention, the motor control circuit 112 includes a varying duty cycle pulse width modulation circuit (PWMC) 124 and a switch 126. In accordance with the embodiment of FIG. 2, the PWMC 126 includes a counter 136, a clock 134, and a varying number generator 138. The counter 136, which may suitably be a commonly available up-down counter or the like, includes a clock input 140 and a duty cycle value input 142 as is well known in the art. In particular, commercially available counter circuits, including those integrated into microcontrollers and other circuits, typically have a clock input that drives the counter output pulses and a duty cycle input that determines the length of the on-time of each output pulse. The clock input 140 is operably coupled to receive a clock signal from the clock 134, and the duty cycle value input 142 is operably coupled to receive a varying number value from the varying number generator 138.

In the exemplary embodiment described herein, the varying number generator 138 is a pseudorandom number generator. A suitable pseudorandom number generator may be implemented in a plurality of ways that employ digital circuitry and are known to those of ordinary skill in the art. For example, the varying number generator 138 may suitably be a circuit internal or external to a processor or microcontroller that obtains the instantaneous program counter value for use as the output pseudorandom number value.

If a source of true random numbers is available, such as that derived from white noise or the like, then the varying number generator 138 may suitably derive the varying number value from the true random number.

In another alternative, it may be desirable to employ a varying number generator 138 that provides a defined repeating pattern of varying number values instead of pseudorandom or random values. Such a defined pattern may be used to generate a specified noise spectrum, as opposed to a pseudorandom spread noise spectrum. For example, it may be desirable to suppress any noise energy within a particular resonant frequency of the mechanical system to which the rotor 16 is attached. Accordingly, a varying number pattern that is specifically designed to produced minimal noise energy at that frequency may be developed. In such a case the varying number generator 138 could simply be a device that reads a pattern of predefined varying numbers out of a circular buffer or the like.

The counter 136, as is typical in the art, also includes a divide down circuit internal to the counter 136 that converts the input clock signal to the desired switching or cycle frequency of the PWM signal. The divide down circuit thus is operable to convert a processor or microcontroller clock signal, which may have a clock speed of several hundred kilohertz to several hundred megahertz, to a desired switching frequency. The desired switching frequency is preferably below the ultrasonic range, for example, below 20 Hz and 500 Hz.

As discussed above in connection with FIG. 1, the PWM circuit 124 may suitably be a vehicular engine control unit in embodiments in which the motor 114 is employed in a vehicle. Microcontrollers that are typically used as engine control units include counters having the characteristics of the counter 136 described above, and also include sufficient circuitry to generate varying number values in the manner described above.

In any event, the varying duty cycle PWM output 144 is operably coupled to a control input 128 of the switch 126. The switch 126 further includes a first terminal 130 and a second terminal 132. The switch 126 in the exemplary embodiment of FIG. 2 is an n-channel MOSFET. The gate of the MOSFET is the control input 128, the drain is the first terminal 130, and the source is the second terminal 132.

The motor circuit 110 further includes a freewheeling diode 139 that is coupled in forward bias from the first terminal 130 of the switch 126 to the positive voltage terminal 148 of the DC power supply 146. As is known in the art, the freewheeling diode 139 allows current to flow back to the DC power supply 146 to prevent an excessive voltage surge from developing at the first terminal 130 of the switch 126 when the switch 126 is turned off during operation of the motor 114.

In operation of the motor 114, the rotor 116 rotates in response to current from the DC power source 134, which is regulated by the motor control circuit 112.

Specifically, the varying duty cycle PWMC 124 generates a varying duty cycle PWM signal that is provided to the control input 128. To this end, the clock 134 provides a relatively high frequency clock signal to the clock input 140 of the counter 136. The counter 136 employs a divide down circuit to develop the switching frequency, which is typically substantially less than the frequency of the clock signal. Contemporaneously, the varying number generator 138 generates varying number values and provides them to duty cycle value input 142. The varying number generator 138 provides new varying number values at a regular rate. Preferably, new values are provided at least as frequently as the switching frequency.

As discussed above, the varying number generator 138 preferably generates random or pseudorandom values that average out over time to a value that corresponds to an average duty cycle that, in turn, corresponds to a desired motor speed. The pseudorandom number values preferably range plus or minus five to ten percent from the desired average number value.

The counter 136 then generates the varying duty cycle PWM signal by generating output pulses at a rate equal to the switching frequency, each pulse having a length or duration defined by one of the received varying number values. The counter 136 provides the varying duty cycle PWM signal at its PWM output 144.

The control input 128 receives the varying duty cycle PWM signal from the PWM output 144. The MOSFET switch 126 then alternately electrically connects and disconnects the first terminal 130 to and from the second terminal 132 responsive to the varying duty cycle PWM signal at the control input 128. As discussed above in connection with FIG. 1, the alternate connecting and disconnecting regulates the current through the coil 118 in the motor 114 to control the rotational speed of the rotor 116. The freewheeling capacitor 139 operates in a manner identical to that described above in connection with FIG. 1 to prevent a large voltage buildup at the first terminal 130 of the MOSFET switch 126.

Referring again to the general motor circuit 10 of FIG. 1, it is noted that there exists the need to limit the inrush current to the motor 14 when the motor 14 is started because there has been no back emf built up in the motor 14. Such a need is accentuated when a low switching frequency (20 Hz to 500 Hz) is employed. Specifically, limiting the inrush current helps protect, among other things, the switch 26 and increases its durability.

One method of limiting the inrush current is to cause the varying duty cycle PWMC 24 to generate a high starting switching frequency. The high starting switching frequency PWM signal could have a constant duty cycle. After the rotor 16 reaches a predetermined speed, or otherwise after a predetermined start-up period, the PWMC 24 would then generate the varying duty cycle PWM signal at the lower operational switching frequency.

Another method of limiting the inrush current would be to employ the varying duty cycle PWMC 24 to generate a start-up PWM signal having a duty cycle that is ramped up from zero percent to the desired average duty cycle. When the desired average duty cycle is reached, the PWMC 24 would then generate the varying duty cycle PWM signal in accordance with the present invention.

It will be noted that although not preferable, at least some of the advantages of a spread spectrum PWM drive signal described herein may be realized in a DC brush-type motor when the frequency of the PWM signal is varied instead of the duty cycle. Application of a varying frequency PWM signal, although more difficult and/or costly to implement than varying duty cycle PWM signals, nevertheless spreads the noise energy over several frequency bands.

It will be furthermore be noted that at least some of the advantages of the present invention may be realized in other types of motors, including asynchronous motors. For example, the advantages of employing duty cycle variation to achieve noise spectrum spreading as opposed to relying completely on frequency variation would be realized in other types of motors that employ PWM signals.

In general, it will be appreciated that the above described embodiments are merely exemplary, and that those of ordinary skill in the art may readily devise their own implementations that incorporate the principles of the present invention and fall within the spirit and scope thereof. For example, even the disclosed embodiment may readily be modified to employ different types of dc brush-type motors, or to employ alternative drive circuits, such as those that include a switch interposed between the positive voltage terminal of the DC power source and the motor windings or coils. Such modifications may readily be accomplished by those of ordinary skill in the art.

We claim:

1. A motor control circuit for use in a motor circuit, the motor control circuit comprising:
    a varying duty cycle pulse width modulation circuit operable to generate a pulse width modulated (PWM) signal having a varying duty cycle, wherein an average of said varying duty cycle corresponds approximately to a desired motor speed and said varying duty cycle comprises one of a random or pseudorandom varying duty cycle; and
    a switch having a control input operably coupled to the varying duty cycle pulse width modulation circuit to receive the PWM signal therefrom, the switch further including first and second terminals, the first terminal adapted to be coupled to a coil of the motor circuit, the switch operable to selectively electrically connect and disconnect the first and second terminals responsive to the PWM signal received by the control input.

2. The motor control circuit of claim 1 wherein the varying duty cycle pulse width modulation circuit is further operable to generate the PWM signal such that the PWM signal has a substantially constant switching frequency.

3. The motor control circuit of claim 1 wherein the varying duty cycle pulse width modulation circuit is further operable to generate the PWM signal such that the PWM signal has a switching frequency of between 20 Hz and 500 Hz.

4. The motor control circuit of claim 1 wherein the varying duty cycle pulse width modulation circuit includes:
    a varying number generator circuit operable to generate varying number values; and
    a counter having a clock input and a duty cycle value input, the duty cycle value input operably coupled to obtain the varying number values from the varying number generator circuit, the counter operable to generate the PWM signal such that the PWM signal has a switching frequency based on the clock input and such that the varying duty cycle is based on the varying number values.

5. The motor control circuit of claim 1 wherein the varying duty cycle pulse width modulation circuit includes:
    a varying number generator circuit operable to generate pseudorandom number values; and
    a counter having a clock input and a duty cycle value input, the duty cycle value input operably coupled to obtain the pseudorandom number values from the varying number generator circuit, the counter operable to generate the PWM signal such that the PWM signal has a switching frequency based on the clock input and such that the varying duty cycle is based on the pseudorandom number values.

6. The motor control circuit of claim 5 wherein the varying number generator comprises a processor.

7. The motor control circuit of claim 1 wherein the varying duty cycle pulse width modulation circuit is further operable to generate the PWM signal such that the PWM signal includes a base duty cycle and a pseudorandom duty cycle adjustment.

8. The motor control circuit of claim 1 wherein the PWM circuit comprises a microcontroller.

9. The motor control circuit of claim 8 wherein the microcontroller comprises an engine control unit for a vehicle.

10. The motor control circuit of claim 1 wherein the switch comprises a MOSFET.

11. The motor control circuit of claim 10 wherein the PWM signal has an operating cycle frequency and wherein the varying duty cycle pulse width modulation circuit is further operable to generate a start-up PWM signal having a start-up cycle frequency that exceeds the operating cycle frequency.

12. A motor circuit comprising:

a brush-type motor having a first brush coupled to a DC power supply and a second brush;

a pulse width modulation circuit operable to generate a pulse width modulated (PWM) signal having at least one of a varying on-time and a varying off-time, wherein an average of said at least one varying on-time and varying off-time corresponds to a desired motor speed;

a switch having a control input operably coupled to the pulse width modulation circuit to receive the PWM signal therefrom, the switch further including first and second terminals, the first terminal coupled to the second brush, the switch operable to selectively electrically connect and disconnect the first and second terminals responsive to the PWM signal received by the control input.

13. The motor control circuit of claim 12 wherein the pulse width modulation circuit is further operable to generate a PWM signal having an average switching frequency of between 20 Hz and 500 Hz.

14. The motor control circuit of claim 12 wherein the pulse width modulation circuit is further operable to generate the PWM signal by generating a varying duty cycle PWM signal.

15. The motor control circuit of claim 12 wherein the pulse width modulation circuit is further operable to generate the PWM signal by generating a constant frequency, varying duty cycle PWM signal.

16. The motor control circuit of claim 12 wherein the pulse width modulation circuit is further operable to generate the PWM signal by generating a varying frequency, varying duty cycle PWM signal.

17. The motor control circuit of claim 12 wherein the pulse width modulation circuit is further operable to generate the PWM signal such that the PWM signal includes a base on-time and a random on-time adjustment.

18. The motor control circuit of claim 12 wherein the pulse width modulation circuit comprises a processing device.

19. The motor control circuit of claim 18 wherein the pulse width modulation circuit comprises an engine control unit for a vehicle.

20. A method of controlling a motor circuit, the method comprising:

a) generating a PWM signal, the PWM signal having a varying duty cycle, wherein an average of said varying duty cycle corresponds approximately to a desired motor speed;

b) providing the PWM signal to a switch; and c) employing the switch to alternately electrically connect and disconnect a motor winding of a brush-type motor to a DC power source responsive to the PWM signal received by the control input.

21. The method of claim 20 step a) further comprises generating the PWM signal such that the PWM signal has a substantially constant switching frequency.

22. The method of claim 20 wherein step a) further comprises generating the PWM signal such that the PWM signal has a substantially constant switching frequency of between 20 Hz and 500 Hz.

23. The method of claim 20 wherein step a) further comprises generating varying number values; and generating the PWM signal such that the PWM signal has a switching frequency based on a clock input and such that the varying duty cycle is based on the varying number values.

24. The method of claim 20 wherein step a) further comprises:

generating pseudorandom number values; and generating the PWM signal such that the PWM signal has a switching frequency based on a clock input and such that the varying duty cycle is based on the pseudorandom number values.

25. The method of claim 20 wherein step a) further comprises generating the PWM signal such that the PWM signal has an average cycle frequency of between 20 Hz and 500 Hz.

26. The method of claim 20 wherein step a) further comprises generating the PWM signal such that the PWM signal includes a base duty cycle and a random duty cycle adjustment.

27. The method of claim 20 wherein step a) further comprises generating the PWM signal such that the PWM signal has an operating cycle frequency, and further comprising a step of, prior to step a), generating a start-up PWM signal having a start-up cycle frequency that exceeds the operating cycle frequency.

* * * * *